(12) United States Patent
Novovic et al.

(10) Patent No.: US 10,618,120 B2
(45) Date of Patent: Apr. 14, 2020

(54) CUTTING TOOL

(71) Applicant: ROLLS-ROYCE plc, London (GB)

(72) Inventors: Donka Novovic, Birmingham (GB); Oriol Gavalda Diaz, Nottingham (GB); Dragos A. Axinte, Nottingham (GB); Paul Butler-Smith, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/960,940

(22) Filed: Apr. 24, 2018

(65) Prior Publication Data

US 2018/0311748 A1 Nov. 1, 2018

(30) Foreign Application Priority Data

Apr. 27, 2017 (GB) .................................. 1706687.9

(51) Int. Cl.
*B23B 51/02* (2006.01)
*B23B 51/08* (2006.01)
(Continued)

(52) U.S. Cl.
CPC .............. *B23B 51/08* (2013.01); *B23B 51/02* (2013.01); *B23B 51/0406* (2013.01);
(Continued)

(58) Field of Classification Search
CPC ........ B23B 2251/285; B23B 2251/505; B23B 51/02; B23B 51/04; B23B 51/06;
(Continued)

(56) References Cited

U.S. PATENT DOCUMENTS 3,715,788 A 2/1973 Ayer
4,176,723 A 12/1979 Arceneaux
(Continued)

FOREIGN PATENT DOCUMENTS

EP 320881 6/1989
EP 1275458 1/2003
(Continued)

OTHER PUBLICATIONS

Great Britain Search Report dated Oct. 18, 2017, issued in GB Patent Application No. 1706687.9.
(Continued)

*Primary Examiner* — Eric A. Gates
*Assistant Examiner* — Chwen-Wei Su
(74) *Attorney, Agent, or Firm* — Oliff PLC

(57) ABSTRACT

A cutting tool comprises a tool body having a first end and a second end, and a longitudinal axis extending between the first end and the second end. The first end comprises two or more cutting portions, with each of the cutting portions comprising a cutting edge and a flank surface.

Each cutting edge extends radially outwardly from a centre region of the first end to a perimetral edge of the first end, with the cutting edge being angled relative to the longitudinal axis. Each flank surface extends circumferentially from the cutting edge.

Each of at least two of the two or more flank surfaces comprises an abrasive portion extending over at least a part of the respective flank surface and each abrasive portion comprises a plurality of abrasive features.

13 Claims, 4 Drawing Sheets

(51) Int. Cl.
*B23B 51/04* (2006.01)
*B23P 15/28* (2006.01)
*B28D 1/14* (2006.01)
*B23P 15/32* (2006.01)

(52) U.S. Cl.
CPC ... *B23B 2200/123* (2013.01); *B23B 2200/204* (2013.01); *B23B 2200/245* (2013.01); *B23B 2200/28* (2013.01); *B23B 2226/125* (2013.01); *B23B 2226/31* (2013.01); *B23B 2228/12* (2013.01); *B23B 2251/285* (2013.01); *B23P 15/28* (2013.01); *B23P 15/32* (2013.01); *B28D 1/146* (2013.01); *Y10T 408/353* (2015.01); *Y10T 408/81* (2015.01)

(58) Field of Classification Search
CPC ... B23B 51/08; B23B 51/0406; Y10T 408/81; Y10T 408/353; B28D 1/146; E21B 10/36; E21B 10/46; E21B 10/445
USPC .......................................................... 451/461
See application file for complete search history.

(56) References Cited

U.S. PATENT DOCUMENTS

| | | | |
|---|---|---|---|
| 4,721,421 A | 1/1988 | Klinger | |
| 4,765,419 A * | 8/1988 | Scholz | E21B 10/445 175/415 |
| 5,160,232 A | 11/1992 | Maier | |
| 5,265,688 A * | 11/1993 | Rumpp | E21B 10/445 175/394 |
| 5,443,337 A * | 8/1995 | Katayama | B23B 27/146 407/118 |
| 5,531,281 A | 7/1996 | Murdock | |
| 5,669,943 A | 9/1997 | Horton et al. | |
| 5,890,552 A | 4/1999 | Scott et al. | |
| 5,913,644 A | 6/1999 | DeRoche et al. | |
| 7,258,180 B2 * | 8/2007 | Kersten | B23B 51/02 175/415 |
| 7,360,608 B2 | 4/2008 | Brackin et al. | |
| 8,590,644 B2 | 11/2013 | Hall et al. | |
| 9,144,845 B1 | 9/2015 | Grzina et al. | |
| 10,239,184 B2 * | 3/2019 | Axinte | B24B 53/14 |
| 2007/0199739 A1 | 8/2007 | Schwefe et al. | |
| 2008/0014033 A1 | 1/2008 | McAuliffe et al. | |
| 2008/0179108 A1 | 7/2008 | McClain et al. | |
| 2013/0326964 A1 * | 12/2013 | de Reynal | E21B 10/00 51/309 |

FOREIGN PATENT DOCUMENTS

| | | | |
|---|---|---|---|
| JP | S60177809 | 2/1984 | |
| JP | H0516010 | 1/1993 | |
| JP | H0957515 | 3/1997 | |
| JP | 2003251512 | 9/2003 | |
| SU | 1256886 | 9/1986 | |
| WO | 2009053803 | 4/2009 | |
| WO | WO-2011146955 A2 * | 12/2011 | ............. E21B 10/36 |

OTHER PUBLICATIONS

Great Britain Search Report dated Oct. 10, 2017, issued in GB Patent Application No. 1706686.1.

* cited by examiner

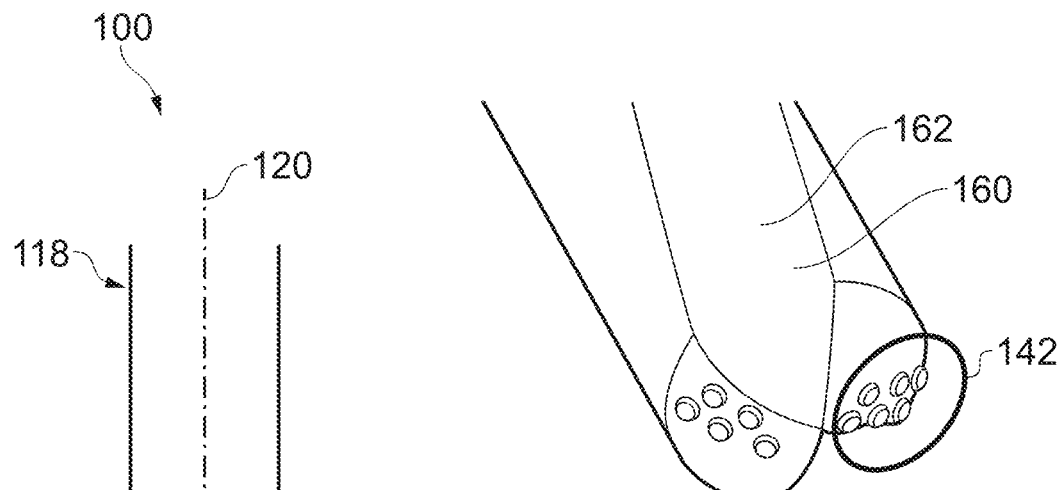
FIG. 2B
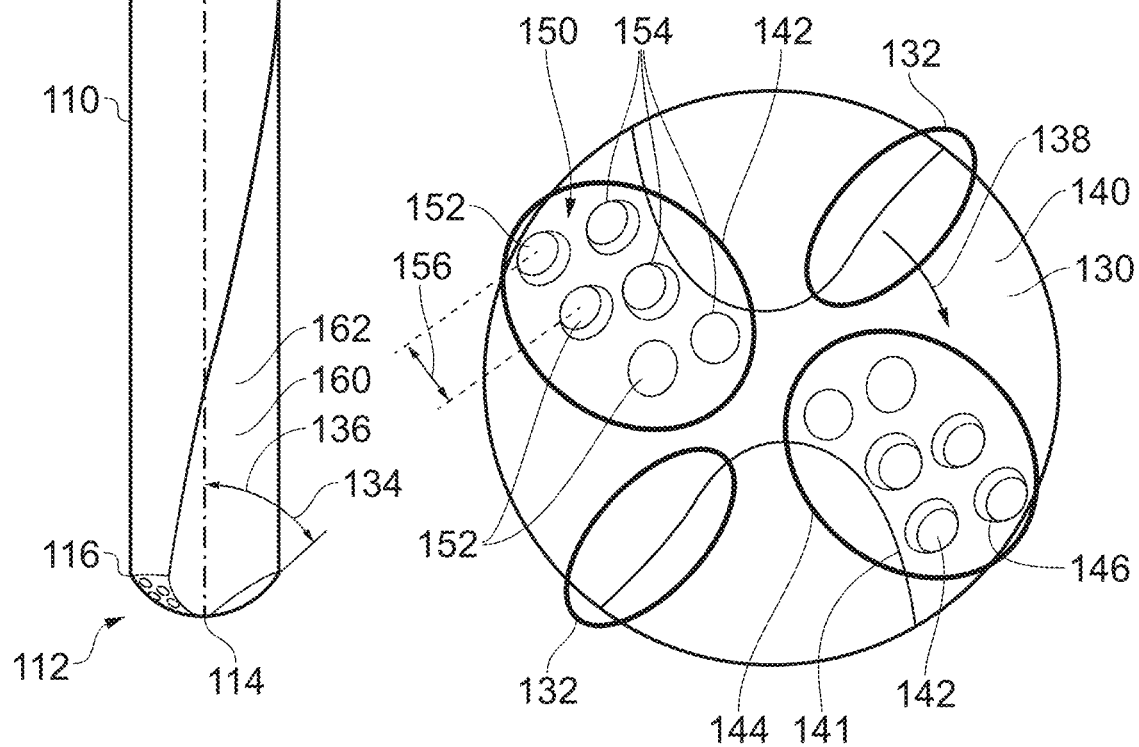
FIG. 2A
FIG. 2C

CUTTING TOOL

CROSS-REFERENCE TO RELATED APPLICATIONS

This disclosure claims the benefit of UK Patent Application No. GB 1706687.9, filed on 27 Apr. 2017, which is hereby incorporated herein in its entirety.

FIELD OF THE DISCLOSURE

The present disclosure relates to a cutting tool having abrasive features and particularly, but not exclusively, to a drill having abrasive features.

BACKGROUND TO THE DISCLOSURE

Ceramic Matric Composite (CMC) materials are formed from ceramic fibres 10 reinforcing a ceramic matrix an example being shown in FIG. 1. CMC materials have excellent high temperature mechanical properties. CMC materials are currently being considered to replace high temperature metal alloys (such as nickel based superalloys) in applications such as gas turbine engine segments, vanes and blades, and also in combustor heat shields.

CMC materials need machining processes such as grinding, drilling or milling to achieve the final shape of the workpiece. Conventional drilling cutter geometries were designed several decades ago and have been optimised for the machining of homogenous materials. For example, in the majority of drill bits, the cutting lips are the only cutting regions. The heterogenic, anisotropic and high hardness properties of these CMC materials means that conventional cutting tools have low material removal rates, a short working life and poor machined surface quality.

Conventional cutting tools experience high wear rates, particularly when the cutting force is dynamically varying through the cut (as is the case for CMC materials). Therefore the cutting edge geometry is rapidly changed, so decreasing significantly the resulting surface quality. This is further exaggerated when machining small tight tolerance features such as micro-size holes and grooves.

STATEMENTS OF DISCLOSURE

According to a first aspect of the present disclosure there is provided a cutting tool comprising:
  a tool body having a first end and a second end,
  the tool body having a longitudinal axis extending between the first end and the second end,
  the first end comprising two or more cutting portions,
  wherein each of the cutting portions comprises:
  a cutting edge extending radially outwardly from a centre region of the first end to a perimetral edge of the first end, the cutting edge being angled relative to the longitudinal axis; and
  a flank surface extending circumferentially from the cutting edge,
  characterised in that each of at least two of the two or more flank surfaces comprises an abrasive portion extending over at least a part of the respective flank surface, and each abrasive portion comprises a plurality of abrasive features.

The cutting tool geometry having abrasive particles on the flank face provides two additional abrasive zones (cutting zones) in addition to the main defined cutting edges. Increasing the quantity of effective cutting zones reduces cutting forces per cutting edge or region, and extends the cutting edge life over conventional cutting tools in which the cutting lips are the only cutting edges These improvements provide a concomitant reduction in machining cost due to an increase of the overall tool life.

When machining heterogeneous CMC and other advanced materials, the increased quantity of cutting zones will also improve the quality of the machined surface by preventing delamination, cracking, fibre pull-out and edge chipping. The increased quantity of cutting zones will also improve surface finish and reduce surface roughness.

The surface quality improvement provided by the additional cutting zones is particularly enhanced when machining small tight tolerance features, such as micro-holes and grooves in CMC and other composite materials.

Providing a plurality of abrasive features across the flank surface improves the effectiveness of the material removal by the abrasive portion by allowing the powdery chip characteristic of CMCs to flow between the individual abrasive features.

Optionally, the abrasive features have a circular profile.

The circular profile of the individual abrasive feature provides a balance between wear resistance and areal coverage across the flank surface.

In other arrangements, the abrasive features may have an alternative profile such as, for example, elliptical, square, rectangular, or lachrymiform.

Optionally, the abrasive features extend from the flank surface as conical frusta.

Forming each of the abrasive features as a conical frustum improves the rigidity and strength of the abrasive features over other geometries.

In other arrangements, the abrasive features may have an alternative geometry such as, for example, pyramidal.

Optionally, the abrasive features are arranged in two adjacent rows across the flank surface, each row extending radially across the flank surface, the first row positioned adjacent to a circumferentially trailing edge of the flank surface, the second row being radially offset from the first row.

Providing the abrasive features in two rows extending across the radial extent of the flank surface with a second row being offset from the first row ensures the full radial extent of the flank surface can be covered by abrasive features while still maintaining 'inter feature' spaces for the removal of machining debris.

In an alternative arrangement the abrasive features may be arranged in more than two rows extending across at least a part of the flank surface.

Optionally, each abrasive feature extends from the flank surface by a feature height, the feature height increasing with radially distal feature position.

The increase in feature height with radially distal feature position results in increase in clearance behind the cutting edge.

In order to allow for this varying increasing abrasive feature height, the flank surface geometry is required to be pre-machined accordingly in order to allow the position of the abrasive feature cutting edges to be aligned precisely relative to the two (or more) main cutting edges of the tool.

Optionally, each cutting edge extends linearly from the centre region of the first end to a perimetral edge of the first end, each cutting edge subtending a first angle with the longitudinal axis.

In one embodiment, each cutting edge is formed as a linear feature. This configuration may be advantageous when machining high hardness materials such as ceramics and the ceramic phases of, for example, CMC materials.

In other embodiments, each of the cutting edges may be formed with a lengthwise profile that is non-linear such as, for example, logarithmic or exponential.

Optionally, the cutting tool further comprises two or more flutes extending along at least a part of the tool body, wherein each of the two or more cutting edges corresponds to a respective one of the two or more flutes.

Forming each flute as a twisted flute provides an improved tool rigidity and improved chip breakage and evacuation when machining high hardness materials.

In an alternative arrangement, each cutting edge may extend from the perimetral edge of the first end towards the second end along at least a part of the tool body as a straight flute. A cutting tool having straight flutes can be manufactured at lower cost than a cutting tool having twisted flutes.

Optionally, the cutting tool is integrally formed from a material selected from the group consisting of diamond materials and cubic boron nitride materials.

Forming the cutting tool from a diamond material ensures that the cutting tool is sufficiently hard to effectively cut the high hardness matrix portion of, for example, CMC materials without the cutting tool suffering from a high wear rate.

In an alternative arrangement the cutting tool may be formed as a modular assembly in which separate cutting portions are attached to a common tool body.

Optionally, the cutting tool is formed from a base material selected from the group consisting of steel, and carbide materials, and the base material is provided with a coating layer selected from the group consisting of diamond materials and cubic boron nitride materials.

Forming the cutting tool from a conventional cutting tool material and then providing a diamond coating layer makes the cutting tool cheaper to manufacture. However, such a coated tool can only be reworked (re-sharpened) a limited number of times before the coating layer is exhausted.

Optionally, the feature height of each abrasive feature is equal to the corresponding depth of the cut along the respective cutting edge.

As outlined above, each set of abrasive features is positioned on a flank surface adjacent to and circumferentially spaced from a respective cutting edge. In use, each set of abrasive features acts as a cutting zone. The feature height of each abrasive feature corresponds to a depth of cut for the respective abrasive feature. In one arrangement, the feature height of each abrasive feature is equal to the depth of cut of the respective adjacent cutting edge. This ensures that the process of the removal of material by the cutting tool is shared between the cutting edge and the corresponding abrasive features.

According to a second aspect of the present disclosure there is provided a method of forming a cutting tool, the method comprising the steps of:

providing a tool body having a first end, a second end, and a longitudinal axis extending from the first end to the second end;

forming two or more cutting portions at the first end, each cutting portion comprising a cutting edge and a flank surface, each cutting edge extending radially outwardly from a centre region of the first end to a perimetral edge of the first end, the cutting edge being angled relative to the longitudinal axis, and each flank surface extending circumferentially from the cutting edge;

characterised in that the method comprises the further step of:

forming an abrasive portion over at least a part of each of at least two of the two or more of the flank surfaces, with each abrasive portion comprising a plurality of abrasive features.

The cutting tool geometry having abrasive particles on the flank face provides two additional abrasive zones (cutting zones) in addition to the main defined cutting edges. Increasing the quantity of effective cutting zones reduces cutting forces per cutting edge or region, and extends the cutting edge life over conventional cutting tools in which the cutting lips are the only cutting edges.

These improvements provide a concomitant reduction in machining cost due to an increase of the overall tool life.

When machining heterogeneous CMC and other advanced materials, the increased quantity of cutting zones will also improve the quality of the machined surface by preventing delamination, cracking, fibre pull-out and edge burring. The increased quantity of cutting zones will also improve surface finish and reduce surface roughness.

When machining heterogeneous CMC and other advanced materials, the increased quantity of cutting zones will also improve the quality of the machined surface by preventing delamination, cracking, fibre pull-out and edge chipping. The increased quantity of cutting zones will also improve surface finish and reduce surface roughness.

The surface quality improvement provided by the additional cutting zones is particularly enhanced when machining small tight tolerance features, such as micro-holes and grooves in CMC and other composite materials.

Optionally, the step of forming two or more cutting portions at the first end, comprises the additional step of:

forming two or more flutes along the tool body, each flute corresponding to a respective one of the cutting portions, each flute extending from the perimetral edge of the first end along at least a part of the tool body.

Forming each flute as a twisted flute provides an improved tool rigidity and improved chip breakage and evacuation when machining high hardness materials.

In an alternative arrangement, each cutting edge may extend from the perimetral edge of the first end towards the second end along at least a part of the tool body as a straight flute. A cutting tool having straight flutes can be manufactured at lower cost than a cutting tool having twisted flutes.

Optionally, the tool body is formed from a diamond material, and the step of forming an abrasive portion over at least a part of each of at least two of the two or more of the flank surfaces, comprises the step of:

selectively ablating a part of the flank surface on at least two of the two or more of the flank surfaces to generate a plurality of abrasive features extending from the flank surface.

For small diameter cutting tools, forming the abrasive features by ablating the flank surface to leave the abrasive features standing proud of the flank surface results in a finished cutting tool in which the abrasive features are an integral with the cutting tool. This makes the cutting tool more robust and useful to a user.

In an alternative arrangement, the abrasive features may be formed by electroplating diamond particles onto the flank surface of the cutting tool. A further alternative technique for forming the abrasive features is by electrical discharge machining (EDM).

Optionally, each abrasive feature extends from the flank surface by a feature height, the feature height increasing with radially distal feature position.

The increase in feature height with radially distal feature position results in increase in clearance behind the cutting edge.

In order to allow for this varying increasing abrasive feature height, the flank surface geometry is required to be pre-machined accordingly in order to allow the position of the abrasive feature cutting edges to be aligned precisely relative to the two (or more) main cutting edges of the tool.

Optionally, the feature height of each abrasive feature is equal to the corresponding depth of the cut along the cutting edge.

As outlined above, each set of abrasive features is positioned on a flank surface adjacent to and circumferentially spaced from a respective cutting edge. In use, each set of abrasive features acts as a cutting zone. The feature height of each abrasive feature corresponds to a depth of cut for the respective abrasive feature. In one arrangement, the feature height of each abrasive feature is equal to the depth of cut of the respective adjacent cutting edge. This ensures that the process of the removal of material by the cutting tool is shared between the cutting edge and the corresponding abrasive features.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which:

FIGS. 2A to 2C show respectively schematic elevational, partial perspective, and end views of a cutting tool according to an embodiment of the disclosure.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
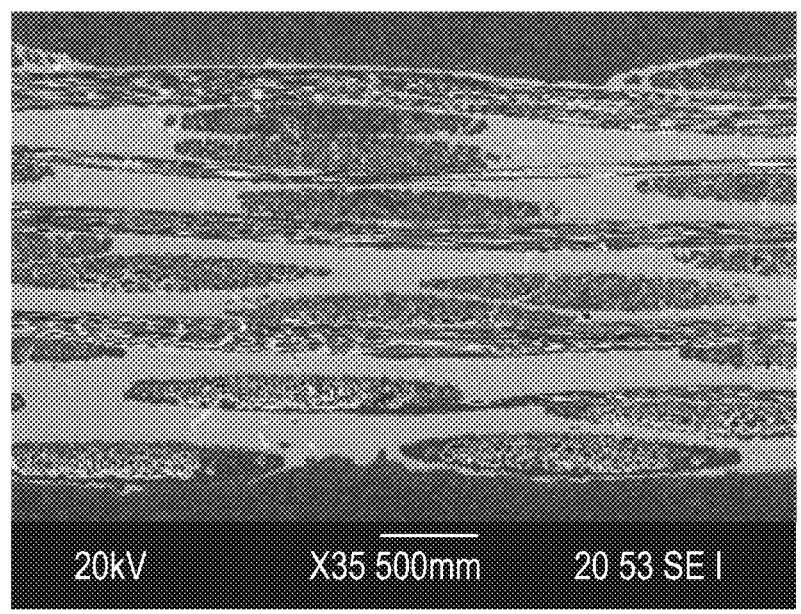
FIG. 1 shows a schematic sectional view of a ceramic matrix composite material.
Figure 3:
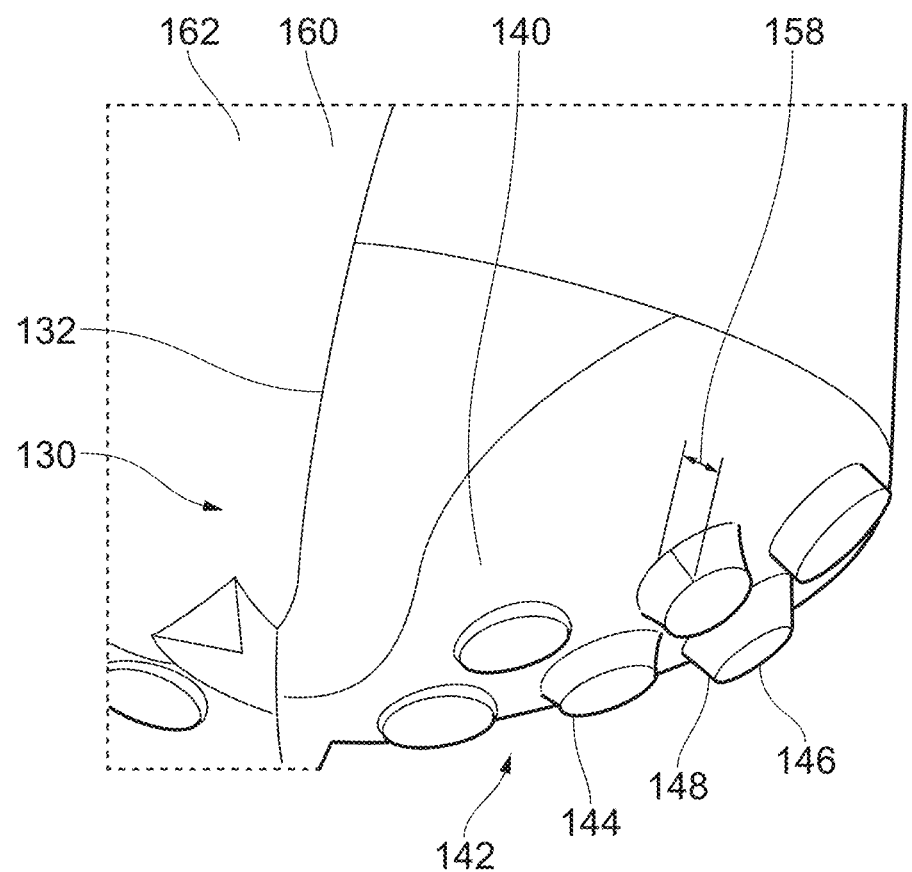
FIG. 3 shows a schematic enlarged partial perspective view of a flank surface of the cutting tool of FIGS. 2A to 2C.

Referring to FIGS. 2 and 3, a cutting tool according to an embodiment of the disclosure is designated generally by the reference numeral 100.

The cutting tool 100 comprises a tool body 110 having a first end 112 and an opposite second end 114. In the present embodiment, the tool body 110 has a generally cylindrical geometry. In other embodiments, the tool body 110 may have an alternative elongate geometry. The tool body 110 has a longitudinal axis 120.

In the present embodiment the second end 114 corresponds to a shank or holding portion (not shown) which would be used to hold the cutting tool 100 in a machine tool (not shown).

The first end 112 of the tool body 110 has a centre region 114 and a perimetral edge 116. The centre region 114 of the first end 112 corresponds to the intersection of the longitudinal axis 120 with the first end 112. The perimetral edge 116 of the first end 112 corresponds to the circumferential edge of the first end 112 of the first end 110.

The first end 112 comprises two cutting portions 130. In other embodiments the first end 112 may comprise more than two cutting portions 130.

Each of the cutting portions 130 comprises a cutting edge 132 and a corresponding flank surface 140. Each flank surface 140 extends circumferentially (direction 138) away from the respective cutting edge 132.

Each cutting edge 132 extends radially outwardly from the centre region 114 of the first end 112 to the perimetral edge 116 of the first end 112. Each cutting edge 132 is oriented at an angle 134 relative to the longitudinal axis 120. In the present embodiment, each cutting edge 132 extends linearly from the centre region 114 of the first end 112 to the perimetral edge 116 of the first end 112, with each cutting edge 132 subtending a first angle 136 with the longitudinal axis.

Each of the cutting edges 132 extends from the perimetral edge 116 of the first end 112 towards the second end 118 along at least a part of the tool body 110 as a twisted flute 162.

At least two of the two or more flank surfaces 140 comprise an abrasive portion 142 that extends over at least a part of the respective flank surface 140. In the case where the first end 112 comprises two cutting edges 132 (as in the present embodiment) then each one of the two corresponding flank surfaces 140 comprises an abrasive portion 142. In an alternative embodiment where the first end 112 comprises four cutting edges then either two, or all four, of the corresponding flank surfaces 140 may comprise an abrasive portion 142.

Each of the abrasive portions 142 comprises a plurality of abrasive features 144. The abrasive features 144 are arranged in two rows 150 across the flank surface 140. Each of the two rows 150 of abrasive features 144 extends radially across the flank surface 140. A first row 152 of abrasive features 144 is positioned at a circumferentially trailing edge 141 of the flank surface 140.

The second row 154 of abrasive features 144 is circumferentially (direction 138) offset from the first row 152. The abrasive features 144 forming the second row 154 are also offset radially from the abrasive features 144 forming the first row 152. This radial offset 156 is arranged such that each abrasive feature 144 in the second row 154 corresponds to the gaps between adjacent ones of the abrasive features 144 in the first row 152.

Each of the abrasive features 144 has a circular plan section 146 and each abrasive feature 144 extends from the flank surface 140 as a conical frustum 148.

Each abrasive feature 144 extends from the corresponding flank surface 140 by a feature height 158. The feature height 158 of each abrasive feature 144 increases with radially distal feature position. In other words each abrasive feature 144 has a feature height 158 that is greater than its radially proximal neighbour.

In the present embodiment the cutting tool 100 is integrally formed from polycrystalline diamond. The process of forming the cutting edges 132, flank surfaces 140 and longitudinal flutes 162 is known and is not described further herein.

The abrasive features 144 are formed integrally with the flank surface 140 by selectively ablating a part of each of the flank surfaces 140. This selective ablation leaves the frustoconical abrasive features 144 standing proud of the flank surface 140. The selective ablation process may be carried out by any suitable means such as, for example, a gas laser.

The abrasive features 144 may alternatively be formed by selectively modifying the flank surfaces 140 using electro-discharge machining. A further alternative arrangement may involve electroplating or brazing the abrasive features 144 to the flank surfaces 140.

In an alternative embodiment where the cutting tool 100 is formed from, say, a carbide material with a polycrystalline diamond coating being subsequently applied, the selective ablation process may be applied to the coating layer in the same manner as outlined above to produce the array of abrasive features 144.

In use, the abrasive portion 142 provides a supplementary cutting action and so reduces the cutting forces experienced by the cutting edge 132. This reduction in cutting force leads to a consequent reduction in the wear rate of the cutting edge 132.

Figure 4B:
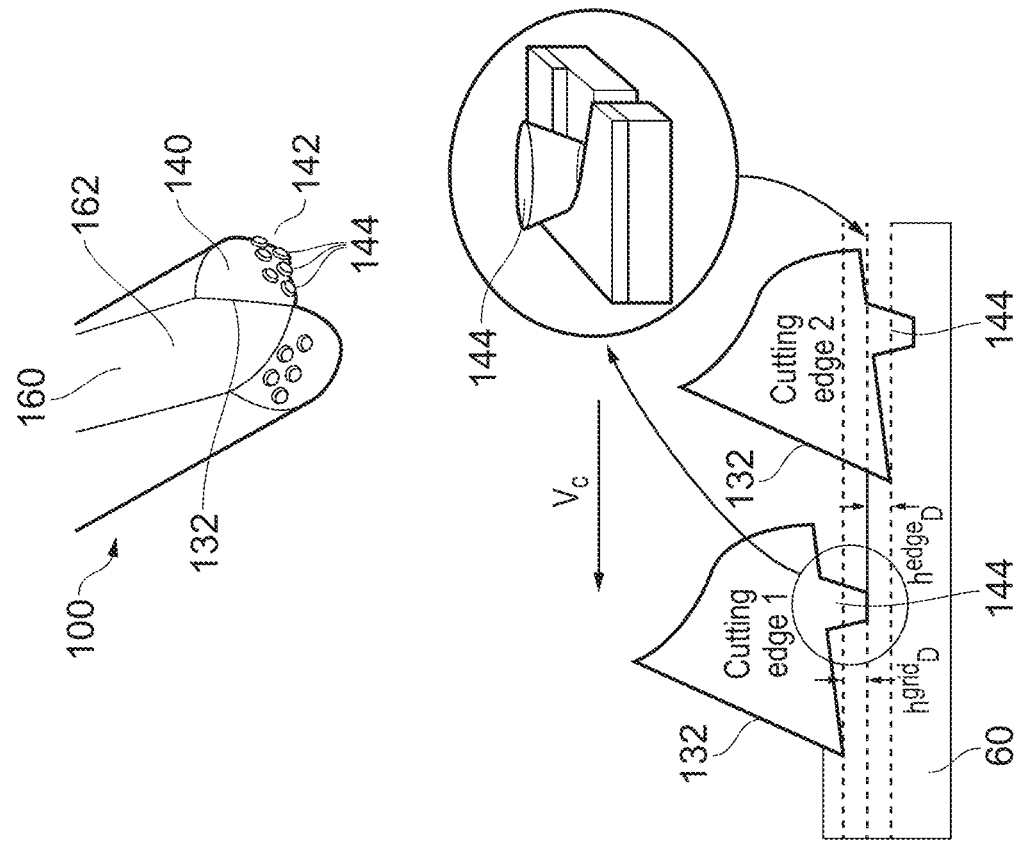
FIG. 4B shows a schematic representation of the action of the cutting edge and corresponding abrasive portion of the cutting tool of FIGS. 2A to 2C.
Figure 4A:
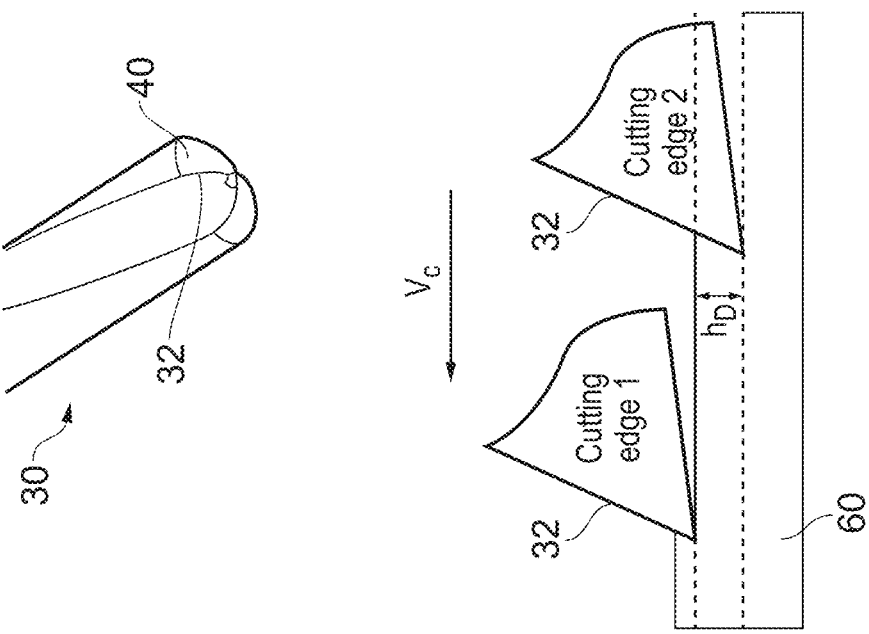
FIG. 4A shows a schematic representation of the action of the cutting edge of a conventional cutting tool.

FIG. 4A illustrates schematically the cutting action of a cutting tool 30 (in this case a twist drill) according to the prior art. The cutting tool 30 comprises two cutting edges 32 and two flank surfaces 40. Each flank surface 40 extends circumferentially away from a respective one of the cutting edges 32.

As the cutting tool 30 meets a material 60 each cutting edge 32 removes a portion of the material 60. This removed material has a depth $h_D$ that is referred to as the uncut chip thickness (or colloquially as the depth of cut). In the cutting tool 30 of the prior art the removal of material is performed entirely by the cutting edges 32.

In contrast, FIG. 4B shows a schematic illustration of the cutting action of the cutting tool 100 of the present disclosure. As shown in FIG. 4B, and as described above, the removal of material is effected by both the cutting edges 132 and the abrasive features 144.

Each of the abrasive features 144 removes a portion of material having a depth $h^{grid}_D$, and each cutting edge removes a portion of material having a depth $h^{edge}_D$. Each of the cutting edges 132 acts as a conventional cutting edge 32 of the prior art, and cuts along its entire linear length. Each of the abrasive features 144 removes material by a ploughing action as illustrated by the enlarged perspective view in FIG. 4B of one such abrasive feature. In this way each of the cutting edges 132 performs less work then a cutting edge 32 of the prior art and hence experiences a lower cutting force and a lower wear rate.

In one arrangement, each of the abrasive features 144 has a feature height 158 that is equal to the depth of cut $h^{edge}_D$ of the corresponding cutting edge. In other words, in this arrangement, the abrasive feature has a depth of cut $h^{grid}_D$ that is equal to the corresponding depth of cut $h^{edge}_D$ of the corresponding cutting edge.

Although the aforementioned embodiments relate to the machining of CMC materials, it is to be understood that the positioning of abrasive features on the flank surfaces of a cutting tool may equally be applied to other cutting tool geometries and materials (i.e. coated and uncoated cemented carbide tools), and also to other machining processes (i.e. to turning inserts, or ball end milling cutters) commonly used for machining aerospace materials such as, for example, nickel and titanium alloy steels.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A cutting tool comprising:
   a tool body including a longitudinal axis extending between a first end and a second end, the first end including a plurality of cutting portions, each cutting portion of the plurality of cutting portions including:
   a cutting edge extending radially outwardly from a center region of the first end to a perimetral edge of the first end, the cutting edge being angled relative to the longitudinal axis, and
   a flank surface extending circumferentially from the cutting edge and including an abrasive portion with a plurality of abrasive features, the plurality of abrasive features having a feature height offset with respect to a height of the cutting edge such that the cutting edge is configured to cut a first layer of a material and the plurality of abrasive features are configured to cut a second layer of the material, which is different from the first layer, and the feature height of each abrasive feature of the plurality of abrasive features increases as a distance of each abrasive feature from the center region increases in a radial direction of the first end.

2. The cutting tool as claimed in claim 1, wherein the abrasive features have a circular profile.

3. The cutting tool as claimed in claim 1, wherein the abrasive features extend from the flank surface as conical frusta.

4. The cutting tool as claimed in claim 1, wherein the abrasive features are arranged in two adjacent rows across the flank surface, each row of the two adjacent rows extending radially across the flank surface, a first row of the two adjacent rows being positioned adjacent to a circumferentially trailing edge of the flank surface, and a second row of the two adjacent rows being radially offset from the first row.

5. The cutting tool as claimed in claim 1, wherein the feature height of each abrasive feature of the plurality of abrasive features is equal to a corresponding depth of cut along the cutting edge.

6. The cutting tool as claimed in claim 1, wherein each cutting edge extends linearly from the center region of the first end to the perimetral edge of the first end, each cutting edge subtending a first angle relative to the longitudinal axis.

7. The cutting tool as claimed in claim 1, further comprising two or more flutes extending along at least a part of the tool body, wherein each of two or more cutting edges of the plurality of cutting edges corresponds to a respective one of the two or more flutes.

8. The cutting tool as claimed in claim 1, wherein the cutting tool is integrally formed from a material selected from the group consisting of diamond materials and cubic boron nitride materials.

9. The cutting tool as claimed in claim 1, wherein the cutting tool is formed from a base material selected from the group consisting of steel, titanium, and carbide materials, and the base material has a coating layer selected from the group consisting of diamond materials and cubic boron nitride materials.

10. A method of forming a cutting tool, the method comprising:
provide a tool body including a longitudinal axis extending from a first end to a second end;
forming two or more cutting portions at the first end, each cutting portion including a cutting edge and a flank surface, each cutting edge extending radially outwardly from a center region of the first end to a perimetral edge of the first end, the cutting edge being angled relative to the longitudinal axis, and each flank surface extending circumferentially from the respective cutting edge; and
forming an abrasive portion over at least a part of each of at least two of the two or more of the flank surfaces, each abrasive portion including a plurality of abrasive features, the plurality of abrasive features having a feature height offset with respect to a height of the cutting edge such that the cutting edge is configured to cut a first layer of a material and the plurality of abrasive features are configured to cut a second layer of the material, which is different from the first layer, the feature height of each abrasive feature of the plurality of abrasive features increases as a distance of each abrasive feature from the center region increases in a radial direction of the first end.

11. The method as claimed in claim 10, wherein forming two or more cutting portions at the first end includes forming two or more twisted flutes along the tool body, each twisted flute corresponding to a respective cutting portion of the two or more cutting portions, each flute of the two or more twisted flutes extending from the perimetral edge of the first end along at least a part of the tool body.

12. The method as claimed in claim 10, wherein:
the tool body is formed from a diamond material, and
forming an abrasive portion over at least a part of each of at least two of the two or more of the flank surfaces includes selectively creating by laser ablating, electro-discharge machining, electroplating or brazing, a part of the flank surface on at least two of the two or more of the flank surfaces to generate a plurality of abrasive features extending from the flank surface.

13. The method as claimed in claim 10, wherein the feature height of each abrasive feature is equal to a corresponding depth of cut along the cutting edge.

* * * * *